Thomas W. Bracher's

Impt. in Ornamenting Hat Linings and Tips.

4482

REISSUED JUL 25 1871

Witnesses.

E. Bilhuber.

C. Wahlers.

Inventor.

Thomas W. Bracher per

Van Santwood & Hauff

Attys

AM. PHOTO-LITHOGRAPHIC CO. N.Y. (OSBORNE'S PROCESS.)

UNITED STATES PATENT OFFICE.

THOMAS W. BRACHER, OF NEW YORK, N. Y.

IMPROVEMENT IN HAT-LININGS AND TIPS.

Specification forming part of Letters Patent No. 110,891, dated January 10, 1871; reissue No. 4,482, dated July 25, 1871.

*To all whom it may concern:*

Be it known that I, THOMAS W. BRACHER, of the city, county, and State of New York, have invented a new and useful Improvement in Ornamenting Hat-Linings and Tips; and I do hereby declare the following to be a full, clear, and exact description thereof, which will enable those skilled in the art to make and use the same, reference being had to the accompanying drawing forming part of this specification, in which drawing—

Figure 1:
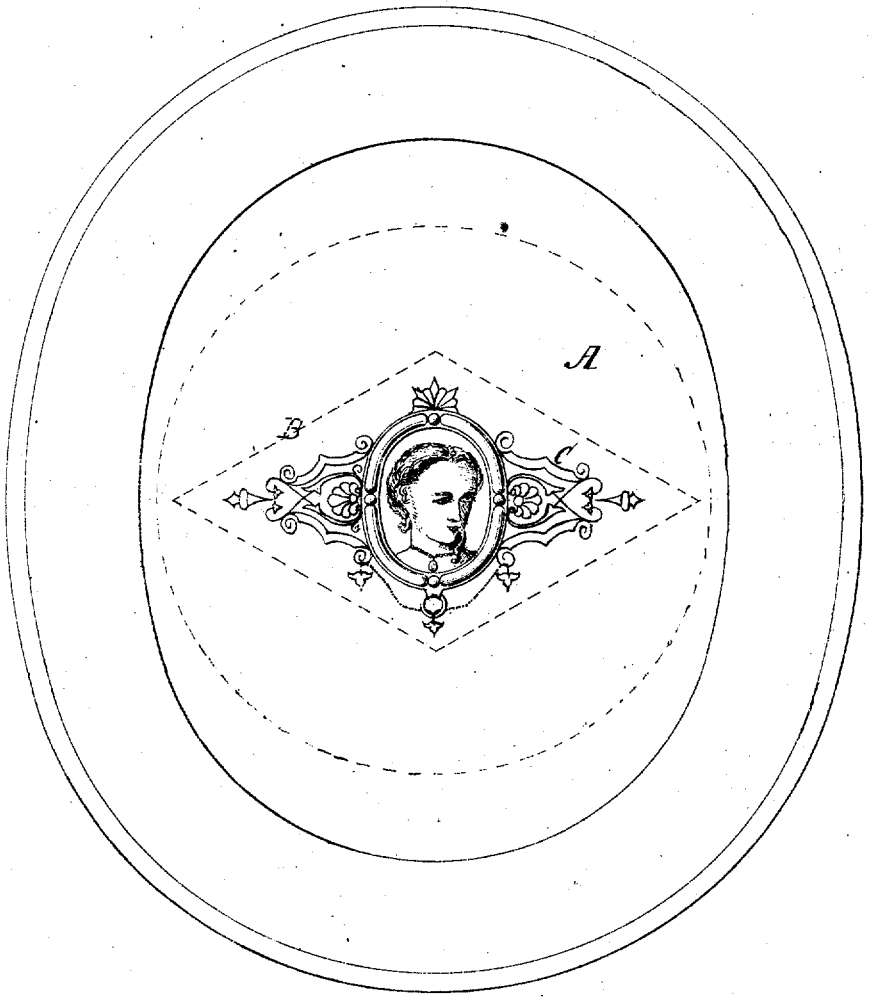
Figure 2:
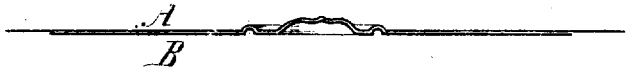

Figure 1 represents a plan view of a hat-lining made according to my invention and applied to a hat. Fig. 2 is a cross-section of the lining.

Similar letters indicate corresponding parts.

This improvement consists in an embossed hat-lining, provided with a backing of paper, cloth, or other suitable material where the embossing is to be applied, with size interposed between the said backing and lining for the purpose of supporting and fixing the image or figure embossed upon the lining; also, in a hat-lining the face of which is provided with metal foil, and subjected to pressure between embossing-dies so as to produce the figures, ornaments, or characters of the dies in relief upon the face of the hat-lining covered with said metal foil; finally, in a hat-lining illuminated with two or more colors by placing leaf of different colors upon the lining where the different parts of the design are to be produced, and then subjecting said parts to pressure, for the purpose of producing impressions in different colors of leaf.

In carrying out my invention, I take a hat-lining, A, of silk, satin, or other material suitable for this purpose, and provide it, at the place where the embossing is to be applied, with a backing, B, of paper, cloth, or other fibrous or woven material, interposing size between the lining and the backing so as to make them adhere to each other. The object of the backing is to support and fix the image or figure embossed upon the lining. To the face of the lining I apply metallic foil of the desired color or colors, at the proper place, and submit it to pressure between embossing-dies, so constructed as to produce the figures, ornaments, or characters of the dies in relief upon the face of the hat-lining.

The upper die is of metal or other material of suitable hardness, and has the parts or figures which are to be embossed or put in relief upon the hat-lining sunken in its face, and I construct the counter-die therefrom by taking layers of pasteboard or other suitable material which will receive and retain impressions, and subject the same to a series of impressions with the die until the sunken parts of the die are fully formed thereon in relief, thereby producing a counter-die of an elastic character at a small cost. I use the embossing-dies also in connection with the ordinary plain type or blocks for printing names or ornaments upon the hat-lining, and in the present example I have combined the embossed impressions with a plain printed border, C, which is arranged around embossed ornaments. The embossed portions of the design consist in this example, of the ring D and of the female bust E.

By placing leaf of different colors upon the lining where the different parts of the design are to be produced the impressions become "illuminated" with two or more colors of leaf.

What I claim as new, and desire to secure by Letters Patent, is—

1. A hat-lining, A, provided with a backing of paper, cloth, or woven material where the embossing is to be applied, with size interposed between said backing and lining, substantially as and for the purpose described.

2. The face of the hat-lining A, provided with metallic foil, as set forth, when the same is subjected to pressure between embossing-dies, as and for the purpose herein shown and described.

3. A hat-lining, provided with impressions illuminated with two or more colors by placing leaves of different colors upon the lining where the different impressions are to be produced.

Witnesses: T. W. BRACHER.

W. HAUFF,

E. F. KASTENHUBER.